J. C. BLANEY.
EMERGENCY BRAKE.
APPLICATION FILED AUG. 4, 1920.
1,384,589. Patented July 12, 1921.
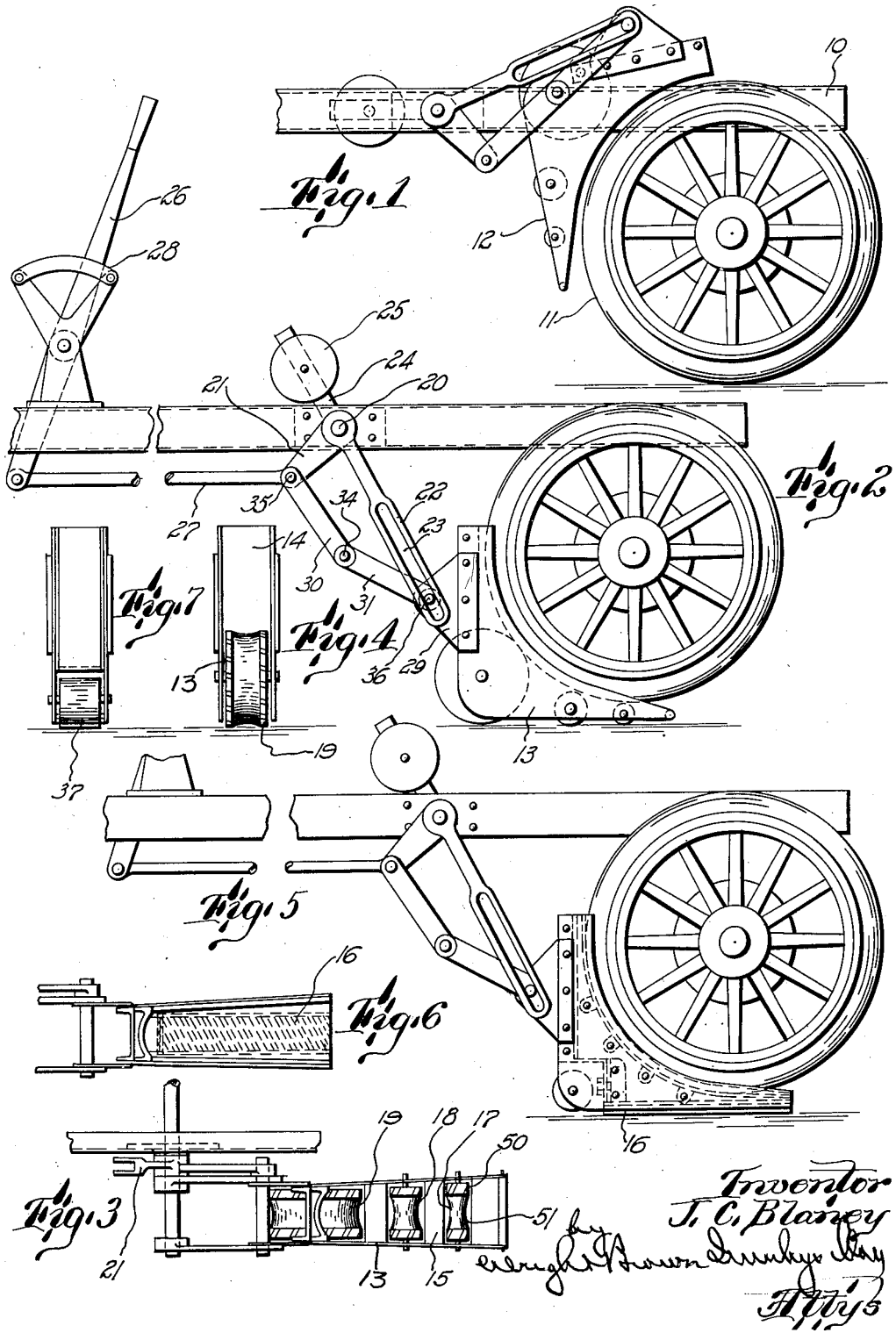
Inventor
J. C. Blaney

UNITED STATES PATENT OFFICE.

JAMES CHARLES BLANEY, OF CLEVELAND, OHIO.

EMERGENCY-BRAKE.

1,384,589.  Specification of Letters Patent.  Patented July 12, 1921.

Application filed August 4, 1920. Serial No. 401,186.

*To all whom it may concern:*

Be it known that I, JAMES CHARLES BLANEY, a citizen of the United States, residing at city of Cleveland, in the county of Cuyahoga and State of Ohio, have invented new and useful Improvements in Emergency-Brakes, of which the following is a specification.

The present invention relates to brakes to be used with automobiles, carriages, railway cars and on any other vehicles to which they may be applied.

The brake, which constitutes the subject of the invention, is of the type in which a shoe is designed to rest beneath the drive wheels and between the same and the roadway, or the track on which the wheels run when operating as a brake, and is designed to stop the vehicle to which it is applied suddenly, in order to prevent collision or other accidents. The object of the invention is to so construct the brake that it will prevent the car from skidding when stopped suddenly, and will at the same time stop it with a sufficient degree of elasticity to prevent wear on the tires of the vehicle when suddenly stopped. The brake is preferably to be used only in extreme emergencies and where there is a question of life and death involved.

The form of the device may vary, a specific embodiment being shown on the accompanying drawings, which constitute a part of the present application and which show the device applied to an automobile chassis. It is to be understood that the brake may be made in other forms than that shown, adapting it to a specific use, and that it may be applied to other vehicles than an automobile.

In the drawings:

Figure 1 is a side elevation showing the invention applied to an automobile and in raised or inoperative position as a brake and acting as a mud guard.

Fig. 2 is a view similar to Fig. 1, showing the brake in lowered or operative position as a brake.

Fig. 3 shows the brake device in plan view showing the rollers thereof.

Fig. 4 shows the front roller on the brake device.

Fig. 5 shows another form of the invention.

Fig. 6 is a plan view of the device as shown in Fig. 5.

Fig. 7 shows the roller on the form of the device shown in Fig. 5.

Referring in detail to the drawings by reference numeral, 10 is the running gear of an automobile; 11 is a wheel mounted on the running gear; and 12 is the brake shoe of the invention.

The brake shoe 12, which is an important element of the invention, comprises side member 13, a front member 14 and a bottom member 15. The side members are triangular in shape, having one side of the triangle curved on the arc of a circle and the front edge at substantially right angles to the bottom edge. Between the side members 13 is formed a groove, which is curved longitudinally to conform to the curvature of a wheel and which may be curved transversely to receive the rounded tire of an automobile, or it may be otherwise formed as desired, or as the circumstances may require. The brake shoes may be used singly or in pairs, as desired, with proper arrangement of the operating parts. It will suffice however to describe one shoe, as the operation of two will be obvious therefrom.

In order to prevent the wheel from passing over the front member 14 when run upon the bottom of the shoe, said member is made to extend upwardly a considerable distance, preferably to the level of or above the horizontal center line through the axis of the wheel.

The bottom member may be provided with transverse corrugations or cleats, as shown in dotted lines at 16 in Fig. 6, designed to bite the roadway when in operative position, or may be provided with rollers 17, 18, and 19 as shown in Fig. 3.

The rollers 17, 18 and 19 are formed with corrugated cylindrical portion 50, designed to bite on the roadway, and an intermediate portion which may be curved as at 51, or otherwise shaped to conform with the transverse curvature of the tire of a wheel. There may be any number of these rollers. As shown in the drawings, there are three which are located in transverse slots cut in the bottom member 15 and are journaled for rotation in the side members. The purpose of the rollers is to give elasticity to the braking of the vehicle, and prevent stopping the vehicle too suddenly and thereby throwing the passengers forward. The rollers extend a short distance below the bottom member so as to grip the roadway, and the curved portion thereof extends into the curved groove of the shoe to contact with the tire of the wheel for a purpose which will be set forth in connection with the operation of the device.

To prevent the front edge of the shoe, as shown in Fig. 5, from digging into the roadway, the shoe is provided with a roller 37 which, should the shoe tip forward, will roll on the ground and prevent the sharp front edge of the bottom from digging into the roadbed. In the form of the device shown in Figs. 1 to 4 inclusive, the same result is accomplished by the large roller 19.

When not in use as a brake, the shoe 12 may be raised to the position as shown in Fig. 1, in which position it serves as a mud guard. There is provided suitable mechanism to be operated by the driver of the car whereby the shoe may be raised or lowered at will. The operating mechanism for raising and lowering the shoe may consist of any suitable arrangement known to the mechanical arts. As shown in the drawings it comprises a series of lever-arms and links, which are adapted to be operated through a hand lever placed conveniently to the driver of the machine.

The parts of the operating mechanism in detail comprise a tumbling shaft 20 to which is rigidly secured the forked lever arms 21 and the sliding links 22 having an elongated slot 23 formed in the outer end thereof. There is also rigidly attached to the tumbling shaft an arm 24, to which is adjustably secured a counter weight 25, serving the purpose of a counterbalance for the brake shoe in raising the same to position as shown in Fig. 1. The forked end of lever 21 is connected with the lower end of a hand lever 26 through the medium of a bar 27, the lever 26 being pivoted to work in a sector rack 28 in the usual manner. The bar 27 is connected to a bracket 29 on the shoe 12 by links 30 and 31 pivoted together at one end and respectively to the bar 27 and the shoe 12 at their other ends by pivot pins 34, 35, and 36. The pivot pin 36, by which the link 31 is secured to the bracket 29, is intended to ride in the slot 23 when the shoe is raised and lowered. By this arrangement the shoe may be readily moved up over the wheel and held in its raised position by the extended links 30 and 31 together with the link 22 and the counter weight 25.

The operation of the device is as follows: Assuming the brake shoe is in position as shown in Fig. 1 and it is desired to stop the vehicle suddenly, the operator pulls back on lever 26, thereby dropping the shoe to braking position on the roadbed and under the front portion of the wheel. The clutch may or may not be disconnected, according to the judgment of the driver. The wheel runs up into the groove in the curved face of the brake shoe and is prevented from proceeding further by the high front member 14. Should the sudden shock cant the shoe forward, the front edge will be prevented from digging into the roadbed by the roller 19 or 37 as the case may be. In the form of the device shown in Figs. 5 and 6, the shoe is prevented from skidding by means of the cleats 16, while, in the form of the device illustrated in Figs. 1 to 4 inclusive, the same result is accomplished by the corrugated rollers 17, 18 and 19. When the shoe of form of the device shown in Figs. 1 to 4, contacts with the ground, the first tendency is for it to roll forward under the force of the momentum of the vehicle. The wheel 11, however, rolls forward into the groove as stated above and onto the rollers 17, 18 and 19. When the wheels contact with the rollers, the forward movement of the rollers is retarded and gradually stopped, by the pressure exerted thereon by the vehicle and through the wheels. In this manner a cushioned or elastic stopping of the vehicle is obtained and the passengers are saved from a shoe having a too sudden shock which might result from a plane bottom or one with non-rotary means for checking its progress.

In a device of the kind described above, there is provided a means for preventing skidding of the wheels of a vehicle and at the same time for stopping the vehicle suddenly and without serious shock, if any, to the passengers. The device moreover will prevent wear on tires and is provided with means for preventing its digging into the roadbed. The device is also useful as a mud guard when in inoperative position as a brake and is readily and easily manipulated by the driver of the vehicle.

The device may be used on automobiles, and, with suitable changes in construction to adapt it to the peculiar needs of the situation, may be used on railway cars and various other vehicles without in any way departing from the spirit of the invention.

Having thus explained the nature of my said invention and described a way of making and using the same, although without attempting to set forth all of the forms in which it may be made or all of the modes of its use, what I claim is:—

1. In combination with a vehicle, having a frame and wheels therefor, a brake shoe having side members, a front end member and a bottom member, said end member extending above the horizontal line through the axle of the wheel, said shoe being provided with a groove, into which the wheels of the vehicle may run when the brake shoe is placed on the ground, and means associated with said brake shoe and vehicle whereby the brake shoe may be lowered to and raised from operative position as a brake.

2. In combination with a vehicle, having a frame and wheels on said frame, a brake shoe having side, bottom and front end members, said end member being located at substantially right angles to the bottom member, a roller journaled in front of the forward end of said bottom member, whereby the shoe is prevented from digging into the roadway, and said brake shoe being provided with a groove into which the wheel of the vehicle may run when the brake is in operative position.

3. In a brake for vehicles, a shoe having end and bottom members and having a groove formed therein, and a roller at the front end of said bottom member to prevent the front end of the shoe from digging into the roadway.

4. A brake shoe for vehicles, having an end and a bottom member, a roller at the front end of said bottom member and a roller in said bottom member, said rollers being journaled in the side members and extending below said bottom members.

5. A brake shoe for vehicles, having an end and a bottom member, the brake shoe being provided with a groove, a roller at the front end of said bottom member and a roller in said bottom member, said rollers being journaled in the side members and extending below said bottom members and into said groove and having corrugations to bite the roadway and surfaces located on the central longitudinal portions of said rollers shaped to receive the tire of the wheel.

6. A brake shoe for vehicles, having an end and a bottom member formed with a groove, a roller at the front end of said bottom member and a roller in said bottom member, said rollers being journaled in the side members and extending below said bottom members and into said groove and having corrugations to bite the roadway, and curved surfaces on said rollers adapted to fit the tire of the vehicle wheel.

7. A brake shoe for vehicles, having side, end and bottom members, a second roller at the front end of said bottom member and a roller in the rear thereof, said second roller being journaled in the side members and extending both below said bottom members, said rollers having curved surfaces adapted to fit the tire of the vehicle wheel.

8. In combination with a vehicle having a frame and wheels thereon, of a brake shoe grooved to receive the wheel of the vehicle when in operative position as a brake, and means for lowering the brake shoe to and raising it from operative position as a brake, the construction of the brake and its connection with the vehicle being such that when in raised position it acts as a mud guard.

9. A brake shoe for vehicles having an end member and a bottom member, grooved to receive the wheel of a vehicle, the end member being of such length as to extend to or above the horizontal line through the center of the hub of the wheel.

10. In combination with a vehicle having a frame and wheels thereon, a brake shoe being grooved to receive the wheel of the vehicle when in operative position as a brake, and means for lowering the brake shoe to and raising it from operative position as a brake, said means comprising a sliding link together with coöperating mechanism, the construction of the brake and its connection with the vehicle being such that when in raised position it acts as a mud guard.

In testimony whereof I have affixed my signature.

JAMES CHARLES BLANEY.